United States Patent
Gifford et al.

[15] 3,648,834
[45] Mar. 14, 1972

[54] METHOD OF MAKING RIGID PACKAGES FROM FLEXIBLE FILMS AND PRODUCTS PRODUCED THEREBY

[72] Inventors: Maurice J. Gifford; Oscar E. Seiferth, both of Madison, Wis.

[73] Assignee: Oscar Mayer & Co., Inc., Chicago, Ill.

[22] Filed: July 14, 1967

[21] Appl. No.: 653,433

[52] U.S. Cl. ................................206/46 R, 53/28, 99/1, 156/213, 156/214, 156/292, 156/229, 156/244, 156/272
[51] Int. Cl. .................................................B65d 85/00
[58] Field of Search ..................53/38, 39, 28; 156/229, 244, 156/272, 292, 212, 213, 214; 99/1; 206/46 R

[56] References Cited

UNITED STATES PATENTS

| | | | |
|---|---|---|---|
| 3,083,106 | 3/1963 | Sloan et al. | 156/292 X |
| 3,171,539 | 3/1965 | Holbrook et al. | 156/292 X |
| 3,189,505 | 6/1965 | Sloan et al. | 156/292 X |
| 3,192,091 | 6/1965 | Hey et al. | 156/292 X |
| 3,227,054 | 1/1966 | Helms et al. | 156/244 X |
| 3,274,004 | 9/1966 | Curler et al. | 156/244 X |
| 3,343,663 | 9/1967 | Seidler | 156/244 UX |
| 3,420,679 | 1/1969 | Gifford et al. | 156/244 X |
| 3,433,694 | 3/1969 | Nuttall | 156/244 |
| 3,458,377 | 7/1969 | Lucas | 156/244 |

Primary Examiner—Carl D. Quarforth
Assistant Examiner—Stephen J. Lechert, Jr.
Attorney—Greist, Lockwood, Greenawalt & Dewey

[57] ABSTRACT

The method of forming a package from a flexible film containing a plasticizer or other constituent which is capable of being polymerized upon being irradiated from a high energy source. After enclosing a product in such a packaging film, the thus formed package is subjected to a controlled amount of irradiation from a high energy source to produce cross-linking within the plasticizer or other constituent which results in the flexible packaging film becoming rigid. An electron accelerator, such as, for example, a high voltage Van de Graaff machine, may be used for this purpose. Other suitable irradiation sources include radioactive elements such as Cobalt 60, X-ray devices, corona discharge apparatus and ultraviolet emitters. In order to avoid discoloration of such films, it is preferred that the amount of irradiation not exceed 5 megarads.

In one embodiment of the present invention, a packaging film lamination is formed by extruding a polyvinylidene chloride film and polyvinyl chloride film which, upon being extruded, are immediately received in a supercooling water bath maintained at a temperature of from approximately 30° F. to 100° F. One or both of these film contains an amount of polymerizable plasticizer ranging from approximately 10 percent to 50 percent by weight based on the combined weight of the film forming resin and plasticizer present therein. These films are then pressed together through contacting rollers to form a film lamination. A product to be packaged is then interposed between the film lamination and a base member, which can be a flexible film or rigid material. Peripheral portions of the film lamination are then contacted with said base member to completely enclose the product and crystallization of the polyvinylidene lamina then induced as, for example, by the application of heat. The package is then irradiated in accordance with this invention to rigidify the film lamination.

19 Claims, 7 Drawing Figures

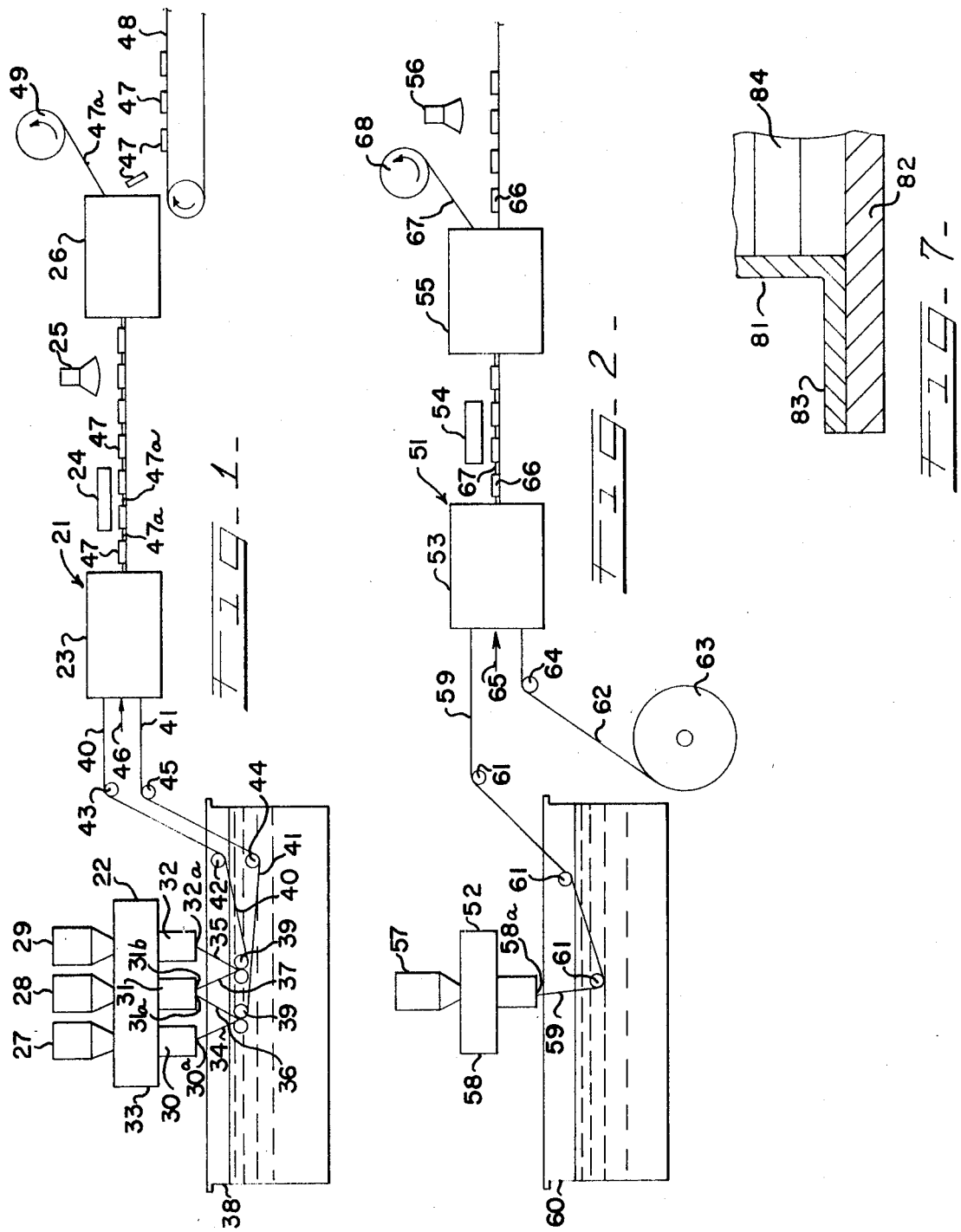

3,648,834

INVENTORS
MAURICE J. GIFFORD
OSCAR E. SEIFERTH
BY Greist, Lockwood, Greenawalt, & Dewey
ATT'YS.

METHOD OF MAKING RIGID PACKAGES FROM FLEXIBLE FILMS AND PRODUCTS PRODUCED THEREBY

BACKGROUND AND DESCRIPTION OF INVENTION

The present invention generally relates to a method of forming rigid packages by cold forming techniques and, more particularly, is concerned with a method of forming packages with a flexible film or film lamination containing a constituent which, when subjected to irradiation from a high energy source, rigidifies such film or film lamination. An important aspect of the present invention is specifically concerned with the extrusion of the packaging film from a film-forming resin and polymerizable plasticizer which affords flexibility to such film during package fabrication and which can be cross-linked or polymerized to rigidify said film following package fabrication by exposing such film to irradiation from a high energy source such as, for example, a high voltage Van de Graaff machine or equivalent device.

While packages formed of rigid film materials such as unplasticized polyvinyl chloride offer advantages with respect to product protection they are more difficult to fabricate than are packages formed of flexible films. For this reason, it has heretofore generally been preferred to employ flexible films for packaging luncheon meats, wieners, cheese and similar food products. Typically, these flexible films contain a plasticizer which imparts the desired degree of flexibility to the film enabling it to be easily handled during package fabrication. For example, a desirable package is presently formed from film laminations having an outer oxygen barrier polyvinylidene chloride film lamina, an intermediate plasticized polyvinyl chloride film lamina and an inner flexible polyvinyl chloride film lamina. In fabricating packages with such film laminations, the individual films are extruded into a water bath wherein they are combined to form the lamination. The polyvinylidene chloride laminae after being extruded and while maintained at a temperature of about 30° F. to 100° F. achieve an amorphous condition during which they can be readily formed about a product and will generally conform to the surface configuration thereof. The polyvinylidene chloride film laminae are then allowed to crystallize and will exhibit substantially random crystal distribution throughout providing that no substantial stretching of these films has occurred during package formation. Typically, following package formation, these packages are subjected to heat for the purpose of inducing crystallization of the polyvinylidene chloride laminae.

The present invention provides a method which uniquely combines the advantages of forming packages with flexible films together with the improved protection afforded to products packaged in rigid packages. As such, this invention is particularly desirable for use in the packaging of meat products such as, for example, wieners, bacon, sliced luncheon meats and the like in that it greatly facilitates the formation of rigid packages which exhibit excellent low temperature properties and which provide improved protection for products packaged therewith.

In accordance with one aspect of the present invention, a film-forming resin is combined with a plasticizer or other constituent which, when subjected to a controlled amount of irradiation from a high energy source (e.g., an electron accelerator) becomes cross-linked or polymerized so as to convert the flexible film extruded therewith into a rigid film. This film can be used as a single ply film or in a film lamination and, after extrusion, is used to package the product in the same manner as with conventional flexible films. Following package fabrication, the film is subjected to a controlled amount of irradiation from the high energy source to provide cross-linking within the polymerizable constituent which produces the desired rigidity to the package.

It is, therefore, an important object of the present invention to provide an improved technique for forming rigid packages.

Another object of the present invention is to provide a method by which the advantages of a flexible film are obtained during the fabrication of rigid packages.

Another object of the present invention is to provide an improved technique for packaging food products and the like with rigid films which accurately conform to the surface configuration of the products.

Another object of the present invention is to provide an improved technique for packaging of food products and the like which involves the extrusion of a film-forming resin combined with a polymerizable plasticizer to form a flexible film which upon being formed about a product being packaged can be subjected to a controlled amount of irradiation for the purpose of rigidifying such film to provide such product with a generally rigid package.

Other objects and advantages of the present invention will be apparent from the following detailed description taken in conjunction with the accompanying drawings wherein:

FIG. 1 is a diagrammatic illustration of a procedure which can be followed in the practice of the present invention;

FIG. 2 is a diagrammatic illustration of a modified procedure also constituting a part of this invention;

FIG. 7 is an enlarged sectional view of the seal area of the package shown in FIG. 6.

Figure 3:
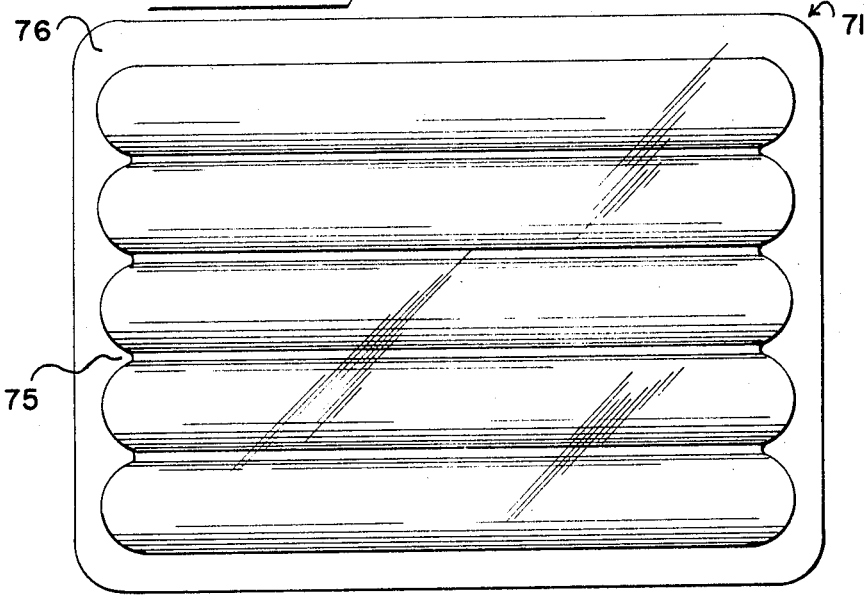
FIG. 3 is a plan view of one type of package of the present invention.

The novel method of the present invention can be employed in the fabrication of packages with a wide variety of film materials. Similarly, this invention can be used with single ply films as well as with multi-ply film laminations. For purposes of illustration, however, it will be initially described in conjunction with the forming of packages having upper and lower film laminations, each of which is composed of an outer oxygen barrier polyvinylidene chloride film and an inner polyvinyl chloride film. In accordance with the present invention, the inner polyvinyl chloride film also includes a plasticizer constituent which becomes polymerized upon being irradiated from a high energy source such as, for example, a high voltage Van de Graaff machine. It will be understood, however, that other films may be substituted for the specific films described in connection with the FIG. 1 embodiment and that the polymerizable constituent can be present in any or all of the laminae.

Referring to the drawings and with particular reference to FIG. 1, the reference numeral 21 generally designates a continuous package forming apparatus which includes a diagrammatically illustrated film forming unit 22, package forming unit 23, polyvinylidene crystallization inducing unit 24, irradiating unit 25, and package separation unit 26.

As is diagrammatically shown, package forming component 22 includes a plurality of hoppers 27, 28 and 29 which respectively communicate with film extruders 30, 31 and 32 through an extruder supply member 33. In the illustrated embodiment, hoppers 27 and 29 contain a ground, powder-like polyvinylidene chloride resin containing approximately 10 percent vinyl chloride and 90 percent vinylidene chloride. Hopper 28 is similarly filled with a vinyl chloride resin and plasticizer which, in accordance with the present invention, affords flexibility to the film formed therewith during package fabrication and which cross-links with itself following fabrication upon being irradiated with a high energy source to rigidify such film.

Extruders 30 and 32 are provided with extruder die slots 30a and 32a from which oxygen barrier polyvinylidene chloride films 34 and 35 are extruded. Similarly, film extruder 31 is equipped with two die slots 31a and 31b from which a pair of identical flexible polyvinyl chloride films 36 and 37 are extruded. Typical extrusion temperatures for these films range from approximately 200° F. to 500° F.

In order to take advantage of the unique supercooling properties of the polyvinylidene chloride film, a controlled temperature water bath 38 is provided. The water temperature in the water bath 38 is preferably maintained at a temperature of from approximately 35° F. to 100° F. in order to "supercool" the polyvinylidene chloride films 35 and 36 causing them to achieve a non-crystalline condition which can be maintained until the combination of time and temperature causes crystallization. While in this amorphous or non-crystalline condition, the polyvinylidene chloride films can be readily sealed to themselves or other films by contact without the application of heat and then be readily formed about the outer surface configuration of a product to be packaged without the formation of folds, pleats or the like in order to provide such products with a surface conforming package.

The polyvinylidene chloride films 34 and 35 and polyvinyl chloride films 36 and 37 are received between a plurality of laminating rollers 39 in surface engagement with each other to form film laminations 40 and 41. The thus formed film laminations are immediately supercooled with the unique supercooling properties of the polyvinylidene chloride film providing for intimate adherence with the polyvinyl chloride.

Upper film lamination 40 and lower film lamination 41 are directed around guide rollers 42 and 43 in generally spaced parallel relationship to each other into the package forming unit 23 of the continuous package forming apparatus 21. As is generally indicated by the reference numeral 46, a product to be packaged is also introduced in the package forming unit 23 in generally intermediate spaced relationship between upper and lower film laminations 40 and 41.

Package forming unit 23 can be of known construction for handling flexible packaging films. For example, in the illustrated embodiment wherein polyvinylidene chloride films are used, suitable package forming machines are generally described in U.S. Pat. Nos. 3,083,106 and 3,129,549. The spaced supercooled polyvinylidene chloride and polyvinyl chloride film laminations 40 and 41 are automatically and continuously introduced into the package forming component wherein package forming dies automatically form packages enclosing the products fed onto the film during movement of the same through the apparatus. Vacuum controls are utilized to maintain proper separation of the films during package evacuation steps of the process and vacuum can also be utilized to bring these film laminations into intimate contact with the products located therebetween while such products are enclosed in a die. In this manner, full utilization of the supercooled properties of these films is obtained without the use of heat. Suitable and known sealing techniques can be employed with such packaging operation including, for example, the use of a plasticizer or pressure-sensitive adhesive. In situations wherein self-adhering films are employed, suitable hermetic seals can be obtained by merely contacting the peripheral portions of these packages in the package forming apparatus. In accordance with an important aspect of the present invention, the polyvinyl chloride lamina is still in a flexible condition during this stage of the package fabrication operation.

Individual product-enclosing packages 47 emerge from the package forming unit 23 as an integrally formed chain between a web 47a of continuous film formed by the combined film laminations 40 and 41. The supercooled polyvinylidene laminae are then sufficiently crystallized so as to overcome the supercooled properties of the film to enable efficient handling thereof. Typically, the crystallization inducing component 24 can be in the form of a heater element for subjecting such packages 47 to controlled heating.

In the embodiment illustrated in FIG. 1, the packages 47 are then subjected to irradiation from a high energy source 25 in order to produce cross-linking of the polymerizable plasticizer in the polyvinyl chloride film laminae, thereby rigidifying upper and lower film laminations 40 and 41 in the packages 47. Suitable high energy sources include an electron accelerator such as, for example, a high voltage Van de Graaff machine, radio active elements such as Cobalt 60, X-ray devices, corona discharge apparatus, ultraviolet emitters and equivalent devices which in effect catalyze the polymerization of the plasticizer or other polymerizable constituents in the upper and lower film laminations.

Following rigidifying of the film laminations, the continuous chain of packages 47 and film web 47a are received in a package separation unit 26. Such units are constructed in accordance with known techniques and are described in more detail in the above referred to U.S. patents. The marginal or waste film 47a is wound upon a spindle 49 for subsequent disposal or further use and the finished packages 47 are received upon a conveyor 48 in condition for further handling or shipping. If desired, package separation unit 26 can be equipped with suitable labeling equipment in accordance with known techniques.

The polymerizable constituent which can be incorporated in the packaging films of the present invention is one which will readily polymerize when subjected to irradiation from a high energy source of the type contemplated by the present invention and which preferably imparts flexibility to such film prior to being irradiated. Typically, such materials can be generally characterized as homopolymerizing plasticizers which will be cross-linked when subjected to irradiation from a high energy source. A specific example of one such material is known as "Santoset I" (Monsanto Chemical Co., St. Louis Mo.). The chemical ingredients of Santoset I are set forth in Federal Regulation 121.2514 "Coatings and Adhesives" which is included herein by reference. Various other materials exhibiting irradiation induced polymerization properties similar to Santoset I and which can be used in the practice of the present invention will be apparent to those skilled in this art. Suitable concentrations of the polymerizable constituent in the single ply film or film lamina of the present invention generally range from approximately 10 percent to 50 percent by weight with respect to the total weight of film forming resin resin and plasticizer, with the specific range of from 20 percent to 40 percent being particularly suitable for use in the packaging of luncheon meat and similar products.

The amount of exposure to the high energy irradiation supplied by the high energy source can best be described as that amount which is sufficient to produce the desired degree of rigidity to the finished packages. Since the packaging films used in the present invention will normally be transparent, it is preferred that in such instances, the amount of irradiation not exceed from approximately 3 to 5 megarads in order to avoid discoloration to the packaging films. In this regard, it is significant to note that a further advantage of the present invention which particularly relates to the packaging of food products is that irradiation necessary to produce rigidity to the packaging film may also be used to sterilize the contents of the package.

A modified package forming apparatus embodying principles of the present invention is shown in FIG. 2. In particular, the apparatus shown in FIG. 2 incorporates a film forming unit and film supply roll, thereby illustrating that the present invention is not limited to apparatus wherein only simultaneously extruded films are employed. Either the extruded film or preformed film in the embodiment shown in FIG. 2 may contain the polymerizable constituent which enables package forming to be conducted with a flexible film followed by irradiation of the finished package with a suitable high energy source to impart rigidity thereto. While the embodiment illustrated in FIG. 2 will be specifically described in connection with the extruding of an oxygen barrier polyvinylidene chloride film and use of a preformed polyvinyl chloride film which contains from 10 percent to 50 percent by weight of a suitable polymerizable plasticizer, it will be understood that other films may be substituted therefor, the only requisite being that at least one of such films contain an effective amount of polymerizable plasticizer. Similarly, as previously noted multi-ply film laminations may be substituted for the single ply films specifically described hereinafter.

Referring to FIG. 2, the reference numeral 51 generally designates a package forming apparatus which includes a film forming unit 52, package forming unit 53, polyvinylidene chloride crystallization inducing unit 54, combined package separation and labeling unit 55 and high energy irradiation source 56.

In the illustrated embodiment, film forming unit 52 includes hopper 57 which continuously supplies a film extruder 58 with a ground, powder-like polyvinylidene chloride resin. In those instances wherein the forming film is desired to exhibit oxygen barrier properties, such resin can contain approximately 90 percent vinylidene chloride and 10 percent vinyl chloride. The thus formed film 59 is extruded through a die slot 58a in film extruding member 58 into a water bath 60 maintained at a temperature of from approximately 35° F. to 100° F. in order to immediately produce supercooling thereof. A plurality of guide rollers 61 direct the supercooled polyvinylidene chloride film into the package forming component 53. A second film 62 is fed from a suitable supply roll 63 around a guide roller 64 into the package forming unit 53 in generally spaced away parallel relationship with the upper supercooled polyvinylidene film 59. As previously noted, film 62 can be polyvinyl chloride film containing from 10 percent to 50 percent by weight of polymerizable plasticizer.

A product to be packaged generally indicated by the reference numeral 65 is supplied to the package forming unit 53 at a location preferably intermediate to the location at which each of the films 62 and 63 are introduced.

Package forming unit 53 can be of known construction along the same general lines described above in connection with the FIG. 1 embodiment. It will be appreciated, however, that alternative flexible film packaging machines may be substituted in place of the previously described unit without departing from the scope of the present invention.

Following package forming, a chain of packages 66 interconnected by a web of packaging film 67 (formed of films 61 and 62) are directed to a crystallization inducing unit 54 which can be in the form of a heater wherein the supercooled properties of the polyvinylidene chloride film are sufficiently overcome to facilitate subsequent handling thereof. The thus crystallized polyvinylidene chloride films are then received in a combination trimming and labeling unit 55 wherein they are labeled and separated from the web 67 which is received upon a suitable collecting roll 68 wherein it may be collected for subsequent use by introducing the same into a shredder from which ground, powder-like polyvinylidene chloride is recycled for blending with unused resin.

The separated packages 66 are discharged from unit 55 for irradiation with high energy source 56 which can be an electron accelerator such as, for example, a high voltage Van de Graaff machine which is capable of irradiating the packages with a sufficient amount of irradiation so as to produce the desired degree of cross-linking of the polymerizable plasticizer in the film 62 so as to rigidify the thus formed package to the desired extent. Other suitable irradiation sources may, depending upon the type and intended use of the packaged products, include radio active elements such as Cobalt 60, X-ray devices, corona discharge apparatus and ultraviolet emitters.

Figure 4:
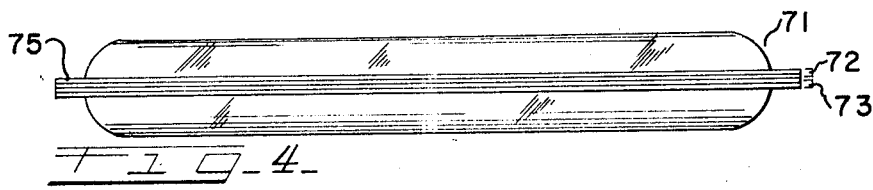
FIG. 4 is a side elevational view of the package shown in FIG. 3.
Figure 5:
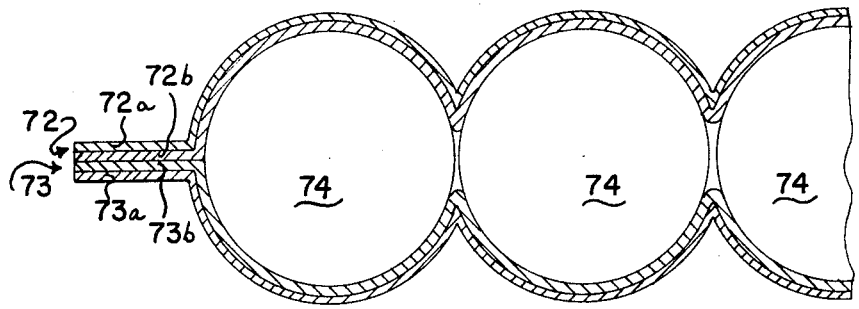
FIG. 5 is an enlarged fragmentary sectional view taken along the line 5—5 of the package shown in FIG. 3.

FIGS. 3-5 generally illustrate a package 71 formed of a top lamination 72 and a bottom lamination 73 which cooperatively enclose therebetween a plurality of wieners or wiener-shaped products 74. The film laminations 72 and 73 are combined peripherally about the products 74 to form a continuous edge seal 75 and are also drawn inwardly about the products to conform to the surface contour thereof, thereby providing the package 71 with an improved appearance and package rigidity which, in combination with the rigidity of these films cooperates to afford added protection to products packaged therewith.

In the embodiment illustrated in these FIGS., laminae 72a and 73a of film laminations 72 and 73 are preferably composed of polyvinylidene chloride films exhibiting oxygen barrier properties such as, for example, those having a vinylidene chloride content of approximately 85 percent by weight and vinyl chloride content of approximately 15 percent by weight.

Inner laminae 72b and 73b can be composed of polyvinyl chloride films having a polymerizable plasticizer content of from approximately 10 percent to 50 percent by weight. Film laminations 72 and 73 upon being extruded, as for example was described in conjunction with FIG. 1, can be supercooled to maintain the polyvinylidene chloride film in an amorphous condition during package fabrication and during which time inner laminae 72b and 73b are maintained in a flexible condition.

In forming the package 71, the film laminations 72 and 73 are contacted with the products 74 placed therebetween with suitable means being used to both seal off the product area and evacuate the area between these film laminations. During evacuation, the laminates are thus drawn into intimate contour-conforming relation with the products 74 and the peripheral edge seal 75 automatically formed. In this respect, the supercooled polyvinylidene chloride laminae 72a and 73a exhibit unique formability to obtain the shape of a final package. Following this step of package fabrication, the polyvinylidene chloride laminae are then subjected to crystallization inducing means. The polymerizable plasticizer constituent of the polyvinyl chloride film laminae 72b and 73b can then be subjected to high energy irradiation in order to impart the desired rigidity to the finished product.

If desired, a suitable paper tab 76 or similar device may be incorporated in the seal area to facilitate separation of the top and bottom laminations for access to the packaged products. Similarly, a suitable pressure sensitive adhesive can be applied to the contacting surfaces of the inner laminae 72b and 73b to provide these packages with advantageous reseal characteristics.

Other films may be substituted for the specifically mentioned polyvinylidene chloride and polyvinyl chloride films in the fabrication of packages of the type described in FIGS. 3-4. For example, single-ply films as well as three or more multi-ply film laminations may be substituted for either or both of the specific two-ply film laminations 72 or 73. The principal feature of the present invention requires only that at least one of the packaging films contain a constituent which will impart to such film a desired degree of rigidity when such film is subjected to irradiation from a high energy source.

Figure 6:
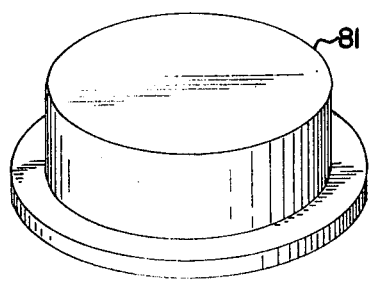
FIG. 6 is a perspective view of another type of package of the present invention.

Referring to FIGS. 6 and 7, a modified package embodying principles of the present invention is generally shown. This package is particularly suitable for the packaging of sliced luncheon meats such as, for example, bologna, salami, meat loaf, chopped ham loaf, and the like.

As is best shown in FIG. 7, the package 81 includes a baseboard 82 formed, for example, of a rigid material such as rigid unplasticized polyvinyl chloride or bleached Kraft paperboard having a thickness of from approximately 0.012 to 0.020 of an inch. If desired, either the bottom or upper surface of the baseboard 82 may have applied thereto a suitable water impermeable coating such as, for example, a wax coating. A product conforming packaging film 83, illustrated as a single ply film, but not limited to such construction, is shown. A suitable single ply film could be formed of polyvinyl chloride having in accordance with this invention, a polymerizable plasticizer content of from 10 percent to 50 percent by weight. It will, however, be understood that laminated film stock may be used in place of such a single-ply film. A suitable film lamination could have an outer ply of plasticized polyvinyl chloride film and an inner ply of polyvinylidene chloride. Typically, the outer ply would have a thickness of about 1.0 mil and include from approximately 10 percent to 50 percent by weight of a polymerizable plasticizer with respect to the total weight of vinyl chloride resin and plasticizer. Similarly, the inner ply of polyvinylidene chloride film would have a thickness of approximately 1 mil, this ply preferably constituting a polymer of approximately 85 percent vinylidene chloride and 15 percent vinyl chloride. While package 81 can be formed in the same manner as was generally described in accordance with the procedures of FIGS. 1 and 2, it can be generally noted that film 83 is fully and intimately collapsed during package fabrication and drawn over the exposed surface of the product 84 in tight surface conforming relationship therewith. When a supercooled polyvinylidene chloride, or other adequately formable and stretchable amorphous film is employed and drawn tightly downwardly over the product 84, the film 83 smoothly acquires the configuration of the product and rim, tightly adhering thereto throughout the entire periphery of the base member 82. If desired, a suitable pressure-sensitive adhesive or equivalent material may be used.

The following example is merely illustrative and should not be construed as limiting the scope of the invention.

EXAMPLE

A plurality of packages were formed with a rigid polyvinyl chloride base (having a general construction such as is disclosed in FIGS. 6 and 7) with the upper film 81 being formed of a two-ply film lamination. The outer lamina of this lamination was composed of a polyvinyl chloride film, more fully described below, and the inner ply was formed of polyvinylidene chloride in a thickness of approximately 1.0 mils, such inner ply generally constituting a copolymer of approximately 85 percent vinylidene chloride and 15 percent vinyl chloride. The outer polyvinyl chloride film generally had a thickness of approximately 1.0 mils and was formed from the following ingredients:

| | |
|---|---|
| polyvinyl chloride resin | 100 parts by weight |
| Acryloid KM-227 | 10 parts by weight |
| Santoset 1 | 60 parts by weight |
| Paraplex G-61 | 5 parts by weight |
| Mark Q-152 | 1 part by weight |

In the above formulation the Acryloid KM-227 was used as an impact modifier, the Santoset I was the polymerizable plasticizer, the Paraplex G-61 an expoydized soybean oil was used to keep the film from degrading during extrusion, and the Mark Q-152 acted as a heat stabilizer.

The thus formed packages, each having the outer lamina formed of the above constituents and the inner lamina formed of the polyvinylidene chloride film, were extruded, supercooled and then drawn over the exposed surfaces of a stack of luncheon meat slices which were placed on the rigid polyvinyl chloride bases. The film laminations were intimately collapsed over the exposed surfaces of the product in tight conforming relationship therewith by evacuation techniques as previously described. Following this step, the supercooled amorphous polyvinylidene chloride lamina in each package was heated in order to induce crystallization thereof and the entire package then subjected to irradiation from a high voltage Van de Graaff machine manufactured by High Voltage Engineering Corporation in order to produce cross-linking within the Santoset I. Irradiation dosages of 0.1, 0.3, 1 and 3 megarads were used on individual packages. A slight discoloration in the film lamination was noticeable at 3 megarads. It was observed that rigidifying of the upper films in each of these packages was obtained with all of these dosages and without the use of a catalyst.

While certain embodiments of the present invention have been described, it will be apparent that modifications and variations therefrom may be made without departing from the spirit and scope thereof. Accordingly, only such limitations are to be imposed on this invention as are indicated in the appended claims.

We claim:

1. A method of forming a relatively rigid package, comprising the steps of extruding a flexible packaging film from a film-forming resin and a plasticizer which polymerizes upon being irradiated with a high energy source, said plasticizer being present in said packaging film in a concentration of from 10 percent by 50 percent by weight based on the combined weight of said resin and plasticizer, inserting a product between said packaging film and a base member, contacting portions of said film with said base member to completely enclose said product, and irradiating said packaging film with a high energy source to induct polymerization of said plasticizer and rigidify said packaging film to the desired extent.

2. The method of claim 1 wherein said first sheet of packaging film is subjected to an amount of irradiation which does not exceed 5 megarads.

3. The method of claim 1 wherein said packaging film is combined with a second film to form a film lamination prior to insertion of said products between said lamination and base member.

4. The method of claim 1 wherein said base member is formed of a packaging film.

5. The method of claim 1 wherein said base member is relatively rigid.

6. The method of claim 1 wherein said packaging film is formed from a vinyl chloride polymer.

7. The method of claim 1 wherein said packaging film is formed from a vinylidene chloride-vinyl chloride copolymer.

8. The method of claim 7 wherein said packaging film is immediately supercooled upon being formed to retard crystallization of said film.

9. A method of forming a rigid package, comprising the steps of extruding a polyvinylidene chloride film from a vinylidene chloride-vinyl chloride copolymer resin and a plasticizer which polymerizes upon being irradiated by a high energy source, immediately supercooling said polyvinylidene chloride film to retard crystallization thereof, inserting a product between said polyvinylidene chloride film and a base member, contacting portions of said polyvinylidene chloride film to said base member to completely enclose said product, inducing crystallization of said polyvinylidene chloride film, and irradiating said polyvinylidene chloride film with a high energy source to induce polymerization of said plasticizer and thereby rigidify said polyvinylidene chloride film.

10. The method of claim 9 wherein said polyvinylidene chloride film is combined with a second film to form a film lamination prior to insertion of said product between said film lamination and base member.

11. The method of claim 9 wherein said base member is formed of at least one packaging film.

12. The method of claim 9 wherein said polyvinylidene chloride film is partially stretched over said product to an extent to accurately conform and shape itself to the surface contour of said product.

13. The method of claim 9 wherein said polyvinylidene chloride film is irradiated with irradiation from an electron accelerator, radio active source, X-rays, ultraviolet or corona discharge.

14. The method of claim 9 wherein the intensity of said irradiation from said high energy source does not exceed 5 megarads.

15. The method of claim 9 wherein the concentration of said plasticizer in said polyvinylidene chloride film ranges from about 10 percent to 50 percent by weight, on a dry weight basis.

16. The method of forming packages which comprises encasing an object to be packaged with a flexible film containing a plasticizer constituent which polymerizes upon being irradiated with irradiation from a high energy source to rigidify said flexible film, and after said package is formed subjecting said package to such irradiation to polymerize the plasticizer and rigidify said film material to the desired extent.

17. The method of claim 16 wherein said high energy source is an electron accelerator, radio active source, X-rays, ultraviolet or corona discharge.

18. The method of claim 16 wherein the intensity of said irradiation does not exceed 5 megarads.

19. The product formed by the method of claim 16.

* * * * *